UNITED STATES PATENT OFFICE.

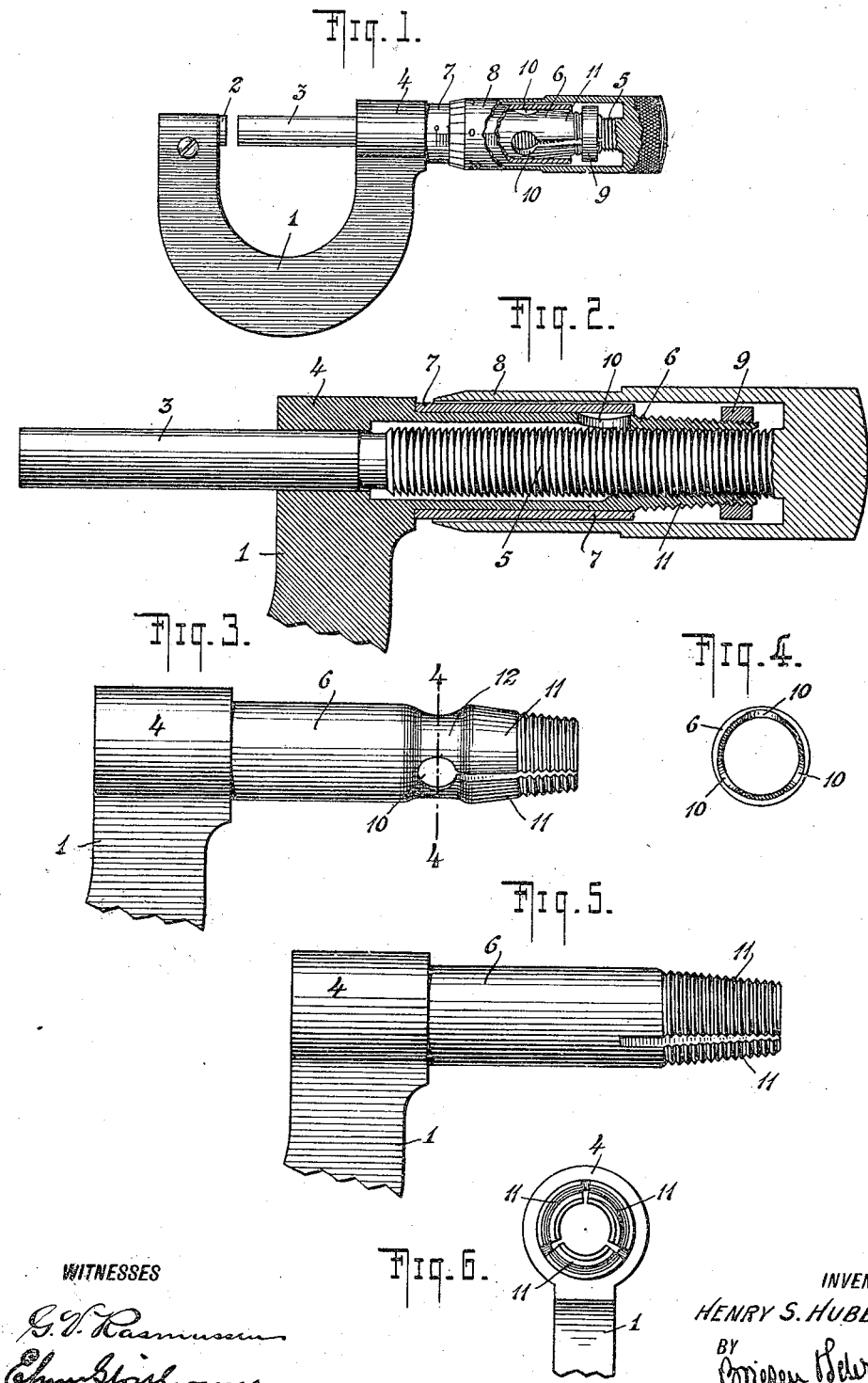

HENRY S. HUBBELL, OF ASHBURNHAM, MASSACHUSETTS, ASSIGNOR TO T. R. ALMOND MANUFACTURING COMPANY, OF ASHBURNHAM, MASSACHUSETTS, A CORPORATION OF NEW YORK.

MICROMETER-CALIPERS.

1,267,075.  Specification of Letters Patent.  Patented May 21, 1918.

Application filed September 2, 1916. Serial No. 118,247.

*To all whom it may concern:*

Be it known that I, HENRY S. HUBBELL, a citizen of the United States, residing at Ashburnham, Worcester county, State of Massachusetts, have invented certain new and useful Improvements in Micrometer-Calipers, of which the following is a specification.

My invention relates to micrometer calipers such as are commonly employed in the arts by expert metal workers, tool makers and mechanics generally for the accurate measurement of thicknesses, diameters and other dimensions.

Micrometer calipers such as are above referred to generally comprise a U-shaped frame having an anvil at the end of one limb and a spindle rotatably engaged with the end of the other limb through a very fine and accurately cut screw thread with which part of the spindle is provided.

Two difficulties are usually encountered in calipers of this kind, one being that of securing and maintaining an exact fit, free from play, wabble or lost motion, between the screw of the spindle and the corresponding thread or nut of the frame; and the other being that of insuring that the spindle shall always stop at exactly the same point, for the same measured dimension interposed between anvil and spindle end, in the hands of the average mechanic.

It is the object of my invention to provide a construction for micrometer calipers of the type specified which shall eliminate both of these difficulties.

My invention will be better understood by referring to the accompanying drawings in which Figure 1 represents a side elevation of a micrometer caliper embodying my invention; Fig. 2 is a detail representing an enlarged axial section, part elevation, through the spindle, frame, sleeve and dial barrel; Fig. 3 represents a detail elevation, enlarged to the same scale as Fig. 2, showing a part of the frame with a modified form of barrel according to my invention; Fig. 4 represents a section taken along the line 4—4 of Fig. 3; Fig. 5 is a view, similar to Fig. 3, showing another modified form of barrel according to my invention; and Fig. 6 is an end view from the right of Fig. 5.

In the drawings, 1 indicates the U-shaped frame of the micrometer caliper; 2 the anvil; 3 the spindle having an accurate sliding fit with the bearing 4, part of the spindle being provided with an accurately cut screw thread 5 having screw thread engagement with the interior end portion of the barrel 6; and 7 the scale barrel which is removably but tightly fitted to the exterior of that part of barrel 6 which lies between the frame and the interior screw threads of said barrel.

The spindle 3, at its outer end, is provided with the usual scale sleeve 8 which is adapted to slip closely but freely over scale barrel 7. The free end of scale sleeve 8 is beveled to a thin edge and this bevel provided with the usual graduation lines to indicate fractional revolutions of the spindle.

Scale barrel 7 is provided with the usual lineally disposed graduations adapted to coöperate with the bevel edge of scale sleeve 8 to indicate complete revolutions of the spindle.

The interior threads of barrel 6, which are in engagement with screw thread 5 of spindle 3, extend from the outer end of the barrel for about one-third of the distance toward the frame 1. The remaining interior portion of the barrel, up to the bearing 4 is reamed out, or otherwise formed to a larger diameter, so that its interior wall is spaced from the spindle.

The barrel 6 is preferably of uniform wall thickness over that portion of its length which is spaced away from the spindle and then tapered inwardly and centrally over the remaining portion of its length which has the interior screw thread.

The tapered portion of barrel 6 is screw threaded from the base of the taper to the end of the barrel and provided with a nut 9. This tapered portion is also provided with longitudinal slots which extend from end to base. As shown, there are three of these slots, spaced annularly 120° apart although four or any other number may be used. At the base of each slot a hole 10, of diameter substantially greater than the width of the slots, is bored through the barrel wall; the parts between the slots may be designated as fingers 11.

In the manufacture of the micrometer caliper, these fingers 11 into which the slots divide the tapered portion of the barrel 6, are sprung strongly toward the axis of the barrel before the spindle is inserted into and its screw threads engaged with the interior screw thread 5 of the barrel. In this way any tendency to play or lost motion caused by wear is automatically taken up inasmuch as the fingers will follow up the screw thread of the spindle at all times irrespective of the amount of wear. This tendency of the fingers to spring inwardly and to follow up the spindle is assisted greatly by reason of the holes 10 since the width of the fingers, at their base between holes 10, is comparatively small and the wall portion of the fingers between the holes approximates a flat surface so as to enable the fingers to spring inwardly and without any tendency to buckle.

An important feature of my invention is the use of what is commonly known as a ratchet screw thread upon the spindle and for the interior coöperating threads of the tapered portions of the barrel 6. By a ratchet screw thread is meant a thread one side of which is substantially perpendicular to the axis of the screw while the other side is inclined as in an ordinary V screw. By having the perpendicular side of the spindle thread face away from the frame and the corresponding face of the interior thread of the tapered portion of barrel 6 face toward the frame, it is obvious that when the spindle is screwed down upon any piece to be measured, which piece is itself abutted against the anvil 2, the spindle will tend to be positively and definitely stopped as soon as it abuts against the piece to be measured inasmuch as the two flat sides of the coöperating screw threads of spindle and barrel will be pressed together along line of resultant pressure coincident with the axis of the spindle. When the spindle screw thread and the coöperating interior screw thread of the end of barrel 6 are V-shaped, then, as soon as the spindle is abutted against the piece to be measured, any further rotatory force imparted to the spindle will be resolved partly into a force acting radially outward to push the fingers 11 away from the screw threads of the spindle, thus giving a false reading of the micrometer. As micrometers are ordinarily made with a V-threaded spindle, errors in their use are almost certain to creep in except in the hands of the most expert mechanics inasmuch as it is almost impossible to apply just the same amount of force in setting the spindle up against the object to be measured on successive measurements. Different mechanics also measure the same dimension differently because of the fact that one mechanic is accustomed to use one degree of force in setting up the spindle against the object to be measured, while another mechanic is likely to use another degree of force. With the spindle provided with a ratchet thread, as in my invention, the same reading will be obtained for each measurement made on the same object within very small limits of error even when made by mechanics of widely differing degrees of skill, unless, of course, a degree of force be applied which is unthinkable in the case of any trained artisan.

If a very greatly excessive force be applied to rotate the spindle there may be a spreading of the fingers 11 so as to cause a slip of the spindle threads with relation to the threads of the tapered portion of the barrel despite the use of the ratchet thread. To avoid this possibility nut 9 may be tightened upon the exterior screw thread at the tapered end of barrel 6 so as to make it impossible for the fingers 11 to spread no matter how much force is applied to rotate the spindle.

In the modified form of my invention, shown in Fig. 3, the only change from the details just described with reference to Figs. 1 and 2 consists in thinning the walls of barrel 6 by means of a peripheral groove 12 in the region of the openings 10. By reason of this thinning, the flexibility of the fingers 11 is increased.

Fig. 5 shows an embodiment of my invention in which the holes 10 are omitted from the barrel 6. This decreases the flexibility of the fingers 11, other things being equal, but this decreased flexibility may be compensated for by making the slots deeper. The construction may, however, answer in some cases.

Having described my invention, I claim:

1. In a micrometer caliper, in combination with a threaded spindle, a barrel having an interior thread at its outer end coöperating with the spindle thread, said end being longitudinally slotted to constitute fingers and said fingers being sprung inwardly to form an opening of a smaller diameter than that of the spindle before said spindle is threaded into the barrel.

2. In a micrometer caliper, in combination with a threaded spindle, a barrel having an interior thread at its outer end coöperating with the spindle thread, said end being longitudinally slotted to constitute fingers and there being holes bored through the barrel at the inner end of each slot, the diameter of the holes being substantially equal to that of the width of the walls between the holes whereby the wall of the barrel between the holes acts as a flat spring.

3. In a micrometer caliper, in combination with a threaded spindle, a barrel having an interior thread at its outer end coöperating with the spindle thread, said end being longitudinally slotted to constitute fingers and there being holes bored through the barrel at the inner end of each slot whereby the wall of the barrel between the hole acts as a flat spring, said fingers being sprung inwardly to form an opening of a smaller diameter than that of the spindle before said spindle is threaded into the barrel.

In testimony whereof I have hereunto set my hand.

HENRY S. HUBBELL.